Jan. 16, 1940.   H. P. CHANDLER   2,187,111
PORTABLE DRILL
Filed Nov. 10, 1936   3 Sheets-Sheet 3

Inventor
HOMER P. CHANDLER
By
Attorney

Patented Jan. 16, 1940

2,187,111

UNITED STATES PATENT OFFICE 2,187,111

PORTABLE DRILL

Homer P. Chandler, Mansfield, Ohio, assignor to The Ohio Brass Company, Mansfield, Ohio, a corporation of New Jersey Application November 10, 1936, Serial No. 110,123

4 Claims. (Cl. 77—8)

My invention relates to portable drills, and particularly for use for drilling one or more cavities simultaneously in the heads of adjacent rail ends.

One of the objects of my invention is the provision of a machine which can easily be moved along the track and light enough to be quickly removed by the operators when necessary.

Another object of my invention is to provide a drilling machine in which the drills can be quickly raised when passing over switches, crossings, etc.

Another object of my invention is to provide a machine in which the drills may be moved manually relative to the rail when applying the drill thereto.

Another object of my invention is to provide a machine for drilling two or more holes simultaneously in adjacent rail ends, and which holes will be of substantially uniform predetermined depth even in cases where the faces of the rails are not in an exact alignment.

My invention resides in the new and novel construction, combination, and relation of the parts herein described and showed in the accompanying drawings.

Figure 1:
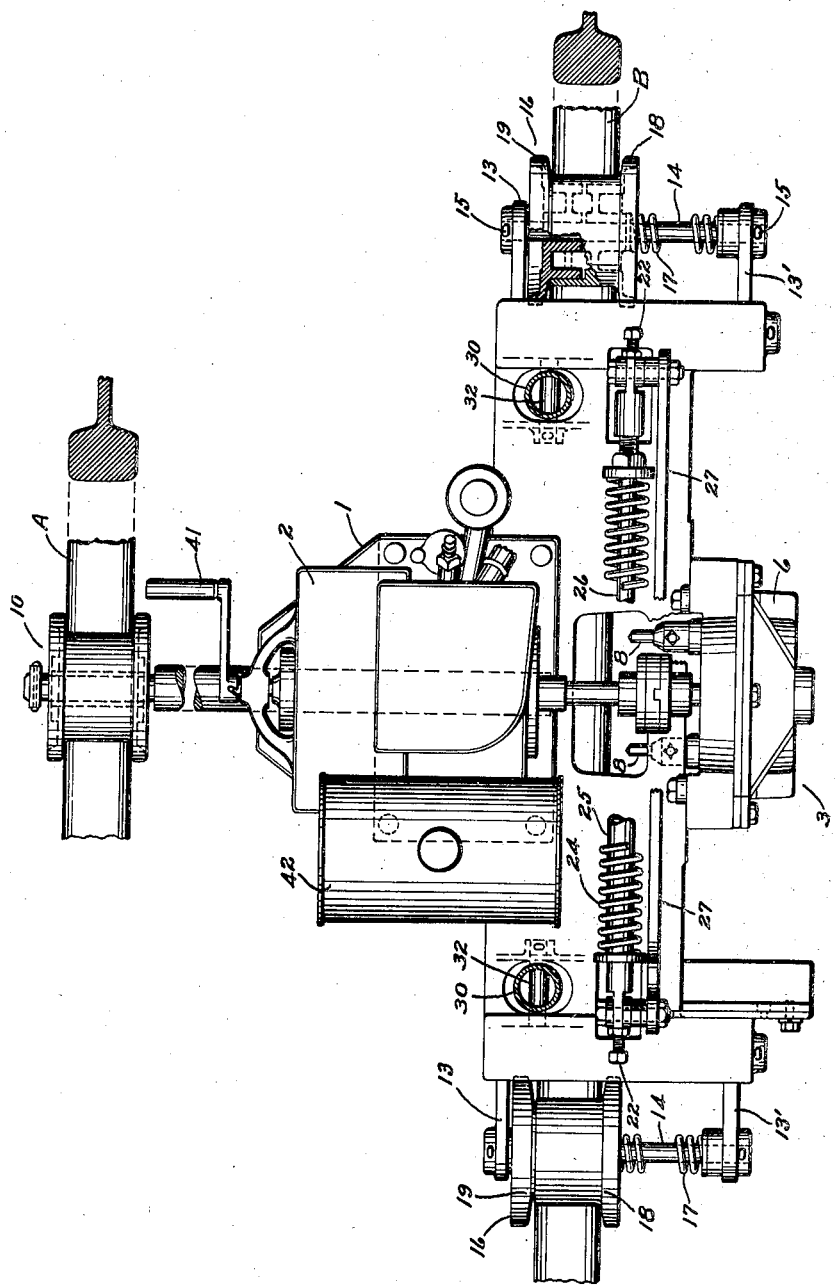
Fig. 1 is a top view of my invention with several of the parts shown in section.

In the preferred embodiment of my invention, I employ a base member 1 upon which is mounted a power plant 2 which I have shown as a gasoline engine, but which may be of other suitable power. Associated with the engine is a transmission 3 connected to the engine by means of the shaft 4 and coupling 5.

The transmission 3 comprises a casing 6 in which is mounted gearing suitable for transmitting motion and power from the engine to the drills and at the speed required.

I am not detailing the gearing as there is nothing new or novel which I claim of the same.

Associated with the gearing are the chucks 7 for holding the drills 8.

Secured to the base or frame 1 is a shaft 9, which has slidably and rotatably mounted upon one end a grooved wheel 10 for operating upon the track rail A.

In order to avoid short circuiting the rails and thus interfering with the proper operation of the signal systems, I insulate the wheel 10 from the axial 9 through the medium of a bushing 11 and washers 12 of insulating materials such as fibre, Bakelite, etc.

To mount the machine upon the other track rail B, I pivotally secure to each end of the machine, and in alignment with the rail, arms 13 and 13'. At the free ends of the arms 13 and 13' is a shaft 14 secured in position by means of the cotters 15. Slidably and rotatably mounted upon each shaft 14 is a roller 16 yieldingly held in the direction of the arm 13 by means of a spring 17.

The roller 16 is composed of two telescopically mounted parts 18 and 19. This construction permits the roller adjusting itself to various sizes of rails and also permits moving the body of the machine transversely of the rail when operating the drills to penetrate the rails.

It will be noted that the spring 17 is constantly pressing the flanges of the parts 18 against one side of the rail B and drawing the flanges of the parts 19 against the opposite face of the rail B and at the same time drawing the entire machine laterally with respect to the rails A and B and bringing the arms 13 into engagement with the part 19 of the rollers 16 which is the normal position of the parts when the machine is not drilling a rail. Thus practically the entire machine, through the medium of the springs 17, is moved and yieldingly held in the direction of that rail which is to be drilled, namely rail B. This means that normally the points of the drill are yieldingly held spaced from the face of the rail which is to be drilled.

The arms 13 and 13' are pivotally mounted on the base or frame 1 by means of the shaft 20. Associated with the arms 13 and 13' is a projecting arm 21, which is provided with a stud 22, the end of which engages a stop nut 23 adjustably mounted on the frame of the machine. The stud 22 is adjustably associated with the arm 21 and regulates the position of the machine body vertically with respect to the rail B. In other words, the studs 22 determine the point at which the drills will enter the rail with respect to the upperly and lowerly surfaces thereof.

Were it not for the fact that the machine may be used where there is special work such as crossings, frogs and etc., it would not be necessary to raise and lower the body of the machine, but on account of such special work it is desirable to have some means of easily and quickly raising the body together with the drills in order to avoid injury thereto when moving the machine through such special work.

Between the arms 21 is a spring 24 mounted upon telescopically arranged members 25 and 26 having their ends pivotally secured to the arms 21. Spring 24 is constantly urging the free ends of the arms 21 to move apart which in turn tends to force the rollers 16 downwardly about the pivots 20 or in other words to raise the body of the machine relative to the rail B. The spring 24 however is not sufficiently strong to raise the machine bodily therefore it is intended at such times as it is desired to raise the machine from its normal drilling position, for the operator to assist the spring by applying manual force sufficient to aid the spring 24. If the springs were sufficiently strong to raise the machine unaided, then it would be necessary to use manual effort to force the machine to its drilling position and provide means to lock it in such position.

In order to hold the machine in the raised position, I employ the toggle arm 27 which is pivoted to one arm 21, and movably secured to the other arm 21 through the medium of the slot 28. When the machine is raised through the efforts of the spring 24 and the operator, the spring will move the arms 21 about the pivots 20 to the positions shown by the dotted lines relative to the machine base. The free end of the arm 21 having the slidable connections with the toggle 27 will come to rest in the curved end 29 of the slot 28 and where it will catch and be held when the operator releases his hold upon the machine, as shown by the dotted position.

Figure 2:
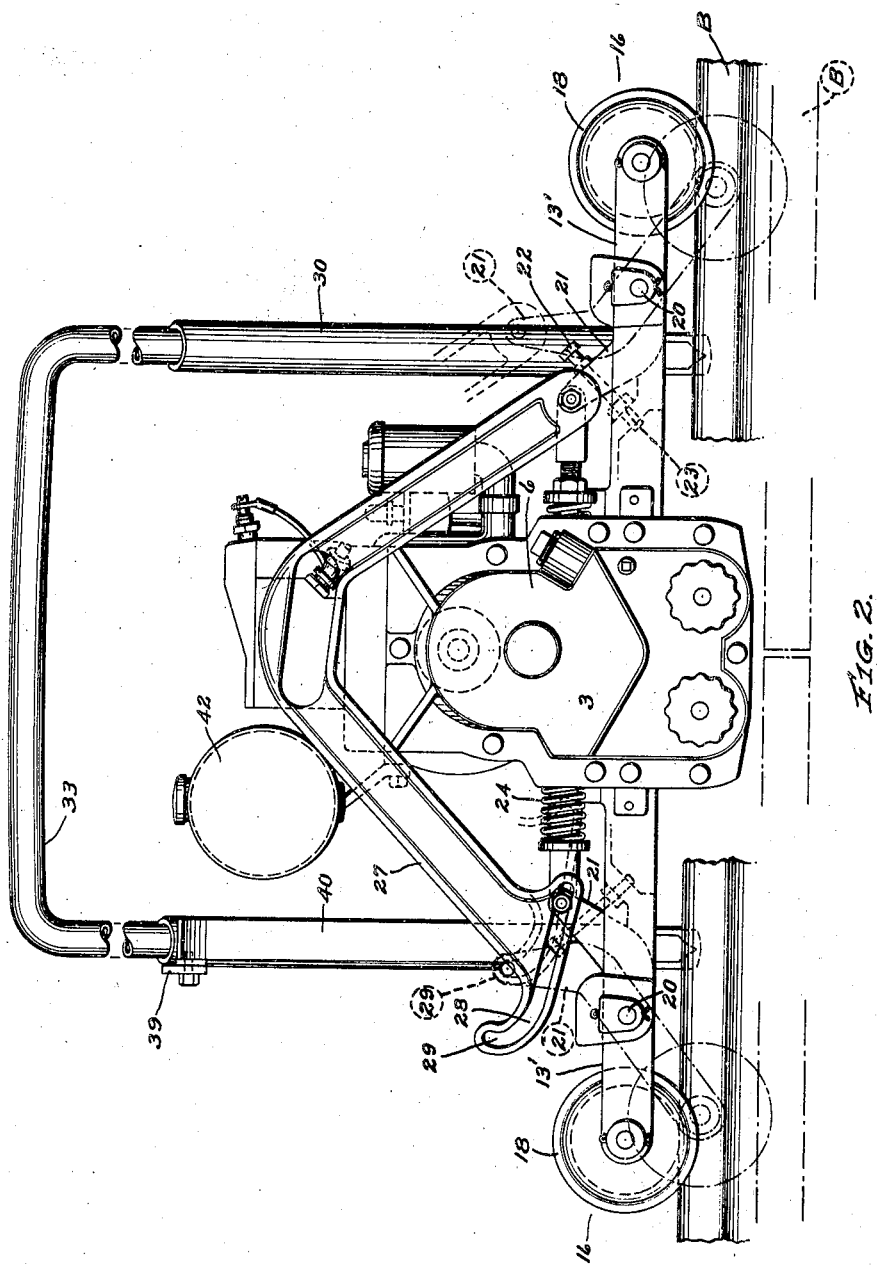
Fig. 2 is a face view of my invention shown in elevation.

In Fig. 2 the full lines show the machine in normal drilling position in respect to the rail B, but Fig. 2 also shows the position of the drilling machine, with respect to the rail B, when the machine has been raised as described.

Figure 3:
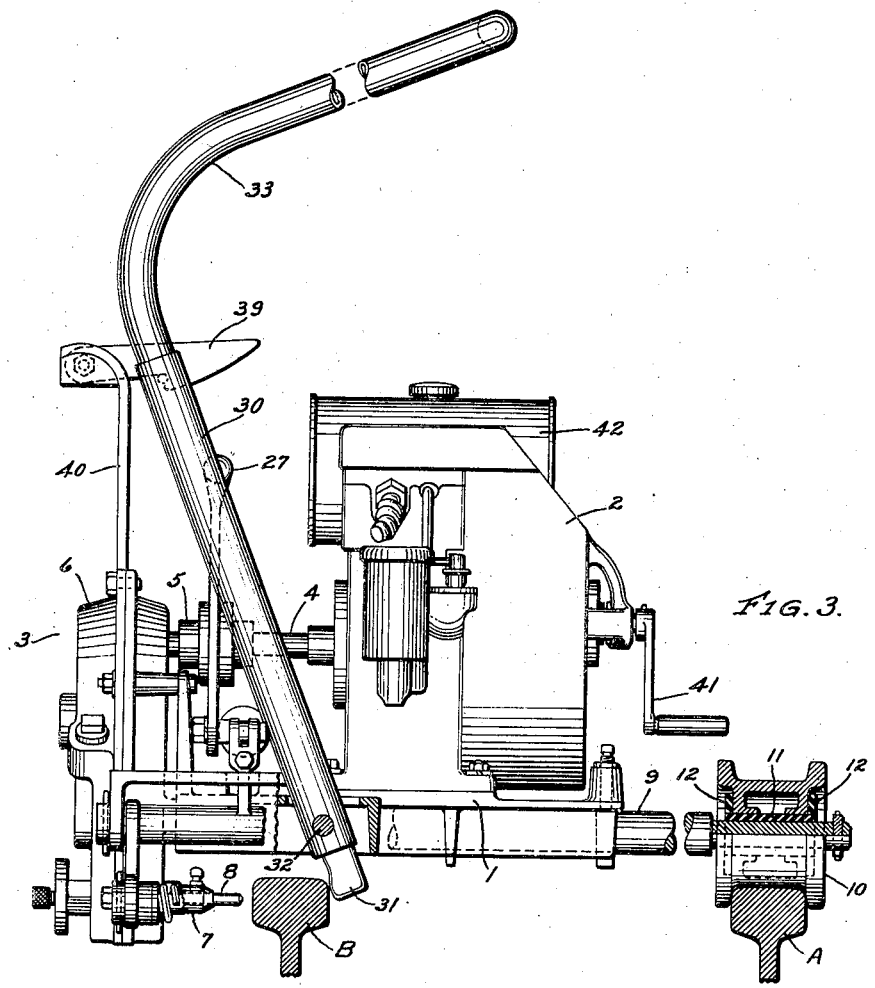
Fig. 3 is an end view of my invention with some parts shown in section.

The normal position of the drills 8 is that shown in Fig. 3, spaced from the face of the rail B. Means is provided for moving the drills into engagement with the face of the rail to be drilled and to move the same as much farther as necessary to drill the holes of the required depth. To effect this movement, I pivot at opposite ends of the body or frame 1 tubular members 30, with one end 31 positioned so as to engage the face of the rail opposite that to be drilled. The pivotal points 32 of the members 30 are placed very low, thus giving a very great leverage in moving the drills while penetrating the rail.

Secured to the upper end of the members 30 is a yoke shaped tubular member or handle 33, by means of which the operator is able to simultaneously move the members 30 as desired. The parts 30—31—32 and 33 are made of very stiff material such that there is no spring under ordinary use and therefore a pull on the part 33 at any point will produce an equal pull on each member 30 and 31; thus the machine body will move parallel to the rails.

The operation of the members 30 through the member 33 is against the tension of the springs 17; the members 14 slid transversely through the rollers 16.

Since the rail head is gripped between the members 18 and 31 as the operator shifts the frame, the frame is held from movement along the rail and no special clamping means is required.

When the operator returns the handle 33 to its inoperative position, the springs 17 move the machine body transversely of the rails to its normal position as shown in Figs. 1 and 3.

It is very important in drilling holes for rail bonds used in electrically connecting the rails, especially where the bond is to be applied in the head of the rail, that such holes shall be of a predetermined depth especially where the bond is of such construction that it depends upon contact with the end wall of the cavity for expansion of the bond terminal.

Figures 4, 5:
Figs. 4 and 5 are details of guides or gauges for regulating the depth to which the drills may penetrate the rail.

In Fig. 4, I show a simple means for gauging the depth of the hole which consists of a threaded stud 34 supported by and adjustable relative to the machine and held by means of a lock nut 35. The depth of the hole is gauged by the difference between the projection of the drill points and the stud 34 from the face of the machine. This type of gauge is effective in drilling newly laid rails where the faces of the rails to be drilled are in perfect alignment.

If desired in place of a single stud 34, two studs may be employed, positioned at the points marked x or at y. Such gauging is desirable if the members 30 should be arranged to act independent of each other or the entire frame 30—33 arranged to yield under a pull.

In Fig. 5, I show an arrangement for gauging the depth of holes in connection with track that has been laid for sometime, and in which the rails may be somewhat out of alignment. This gauge consists of a stud 36 adjustably mounted on the body of the machine and held by means of a lock nut 37. Adjustably mounted on the stud 36 is a yoke 38 arranged to engage both rails. This form of gauge gives very satisfactory results where the rails are out of alignment, but not too far as it tends to even up the depth of the holes.

In order to hold the handle 30—33 in its inoperative position, I provide a latch 39 secured to a standard 40.

A starting crank for the engine is shown at 41 and a gas supply tank as 42.

Modifications will be apparent to those skilled in the art based upon by disclosures; and therefore, I wish to be limited only by my claims:

I claim:

1. In a track drilling machine comprising, a frame movable longitudinally and transversely relative to a track, a power plant mounted on the frame and movable therewith, a drill including a drill bit carried by the frame and movable therewith, means to drive the drill from the power plant, rollers to mount the frame upon the track, the combination with said frame of manually operable means pivoted to the frame and arranged to engage a rail of the track to move the frame transversely of the track and clamp the rail between the last said means and the drill whereby the frame is prevented moving longitudinally of the track while being moved transversely thereof.

2. In a support for a track drilling machine, a frame, a plurality of rollers to travel along the rails of a track, a support secured to the frame, one roller slidably mounted upon the support and arranged to travel along one rail, other supports secured to the frame and each carrying a roller slidably mounted thereon to travel along the other rail, the last said rollers each comprising two telescopically arranged parts having flanges and forming a roller adjustable between flanges to fit varying widths of rail heads, a spring mounted on each support carrying the adjustable rollers and so related to the other parts as to move the flanges of each adjustable roller into engagement with the rail and to move the frame transversely in one direction relative to the track, the combination with said frame of means to manually move the frame in the other direction and at the same time grip the rail to prevent movement of the frame along the track while drilling the rail.

3. A track drilling machine movable longitudinally of the track and including in combination means to control the drilling of the rail and the movement of the machine relative to the track while drilling, the said means comprising a manually operable lever pivotally secured intermediate its ends to the machine and having an arm movable into engagement with that face of the rail opposite the face to be entered by the drill and another arm longer than the first arm to be manually operated whereby the said first arm may be moved into engagement with the rail to feed the drill toward the rail and prevent longitudinal movement of the machine along the rail while drilling.

4. In a support upon which a rail drilling unit may be mounted comprising, a frame provided with means for supporting the frame upon a track to move longitudinally and transversely of the track, the combination with said frame of manually operable means to control the movement of the frame in both directions relative to the track, the said means comprising a lever pivoted intermediate its ends to the frame, one arm of the lever arranged for manual operation and the other arm to engage the rail whereby the frame and drill are moved transversely of the rail to drill the rail while holding the frame against longitudinal movement along the track.

HOMER P. CHANDLER.